United States Patent Office 3,592,735
Patented July 13, 1971

3,592,735
5-(HYDROXYANILINO)-1,2,3,4-THIATRIAZOLES AND METHOD OF MAKING SAME

Robert John Theriault, Kenosha, Wis., and Thomas Howard Longfield, Atlanta, Ga., assignors to Abbott Laboratories, North Chicago, Ill.
No Drawing. Continuation-in-part of abandoned application Ser. No. 636,676, May 8, 1967. This application Apr. 2, 1968, Ser. No. 718,247
Int. Cl. C12d 13/00
U.S. Cl. 195—51
7 Claims

ABSTRACT OF THE DISCLOSURE 5-(hydroxyanilino)-1,2,3,4-thiatriazoles and a method of preparing them by microbial transformation of 5-anilino-1,2,3,4-thiatriazole. These compounds are particularly useful for counteracting hypertension in warm-blooded animals.

---

This application is a continuation-in-part of application S.N. 636,676, filed May 8, 1967, and now abandoned.

SUMMARY OF THE INVENTION

The present invention relates to 5 - (hydroxyanilino)-1,2,3,4-thiatriazoles and more particularly to a method wherein a microorganism is cultured in a fermentation medium properly containing a carbon source, a nitrogen source, mineral materials, and other necessary nutrients together with a substrate comprising 5 - anilino-1,2,3,4-thiatriazole to directly transform the 5 - anilino-1,2,3,4-thiatriazole to 5 - (p-hydroxyanilino)-1,2,3,4-thiatriazole and 5-(o-hydroxyanilino)-1,2,3,4-thiatriazole.

The thiatriazoles of this invention are useful in the treatment of cardiovascular disease such as hypertension and angina pectoria, particularly hypertension. For example, intravenous administration of 5-(p-hydroxyanilino)-1,2,3,4-thiatriazole in a saline suspension at a dose of 2 and 3 milligrams per kilogram (mg./kg.) to unanesthetized dogs elicited a 20 millimeter of mercury (mm. Hg) decrease in mean arterial blood pressure which lasted for 1 to 1½ hours. Intravenous administration of 2 mg./kg. to a neurogenic hypertensive dog elicited a 20 mm. Hg decrease in mean arterial blood pressure that lasted for two hours. Oral administration of 5-(p-hydroxyanilino)-1,2,3,4-thiatriazole at a dose of 10 mg./kg to a renal and a neurogenic hypertensive dog elicited a decrease in mean arterial blood pressure of 30 and 40 mm. Hg, respectively, that lasted for at least three hours.

DETAILED DESCRIPTION

The microorganisms which may be employed in practicing the invention are those that are either naturally or genetically blocked after hydroxylating 5-anilino-1,2,3,4-thiatriazole and may be molds of the order Moniliales and family Moniliaceae such as, for example, *Aspergillus tamarii* NRRL 3280, *Aspergillus terreus* NRRL 1960, *Aspergillus flavus oryzae* type NRRLA 13647, Penicillium species A–1 NRRL 3281, Penicillium species A–85 NRRL 3282, or of the order Mucorales, family Mucoraceae, such as *Rhizopus stolonifer* ATCC 10404; basidiomycetes of the order Agaricales, family Boletaceae, such as *Bolentinus pictus* F–12 NRRL 3284, or of the family Agaricaceae, such as *Pleurotus candidus* SS–31 NRRL 3285, or of the order Polyporales, family Thelephoraceae, such as *Coniphora puteana* USDA Forest Products Lab. Madison #515; and actinomycetes of the order Actinomycetales, family Actinomycetaceae, such as Nocardia species ACT 116 NRRL 3283, or of the family Streptomycetaceae such as *Streptomyces olivaceus* NRRLB–1125. Because they produce a higher yield of 5-(p-hydroxyanilino)-1,2,3,4-thiatriazole, *Aspergillus tamarii* and *Aspergillus flavus oryzae* are usually preferred over the other microorganisms. Cultures of Penicillium species A–1 NRRL 3281 produce grey mycelium, not well sporulated; Penicillium species A–85 NRRL 3282 produce off-white mycelium, not well sporulated; and Nocardia species ACT 116 NRRL 3283 produce typical mucoid bacteria-like appearance on agar slants. Like a typical Nocardia, the subsurface mycelia breaks up into bacillary type cells.

To prepare the p-hydroxylated transformation product, a culture of the selected microorganism is inoculated into multiple flasks of the media. The inoculated flasks are incubated on a shaker from 24–48 hours, at which time .05%–0.1% of the powdered substrate, 5-anilino-1,2,3,4-thiatriazole, is added to each flask. The substrate can also be added from a solvent such as dimethylsulfoxide (DMSO) or dimethylformamide (DMF). Additional increments of substrate may be added in levels of .05% at various time intervals. After addition of the substrate, the flasks are returned to the shaker and are harvested at the optimal age of 120–192 hours for *Aspergillus tamarii* and 120–264 hours for *Aspergillus flavus oryzae* type NRRLA 13647.

The harvested fermentation flasks are pooled and the beer is adjusted to pH 7. The fermentation beer is then extracted twice with four volumes of ethyl acetate and the extract is evaporated to dryness under a vacuum. The ethyl acetate residue is dissolved in acetone and the solution is chromatographed over a neutral alumina column. The p-hydroxylated transformation product is eluted wtih increasing amounts of methanol in acetone. The eluate product fraction is then evaporated to dryness and dissolved in acetone, filtered, and again evaporated to dryness. The resultant residue is extracted several times in small aliquots of acetone. The acetone-insoluble product is a white amorphous solid melting at 149°–150° C. with an elemental analysis of carbon, 43.3%; hydrogen, 3.5%; nitrogen, 28.87%; sulfur, 16.25%; and oxygen, 8.19%. The analysis and the IR spectrum are consistent with the structure for 5 - (p-hydroxyanilino)-1,2,3,4-thiatriazole. The NMR spectrum is also consistent with this structure in deuterated chloroform. The product is strongly phenol- and sulfur-positive, and the UV spectrum shows that the thiatriazole ring is intact.

The aqueous basal fermentation media may contain the usual mineral salts which are normally employed in the cultivation of these microorganisms. Several media which have been found to be useful are exemplified hereinafter, although it is understood that a medium normally used in cultivating the specific species of microorganisms may be used in practicing the invention.

EXAMPLE 1

Fermentation media #1

| | Grams/liter |
|---|---|
| Cerelose (added post sterilization) | 50.0 |
| Soybean flour | 5.0 |
| NaCl | 1.0 |
| Yeast extract | 5.0 |
| $KH_2PO_4$ | 4.1 |
| $K_2HPO_4$ | 0.8 |

Adjust pH to 6.0 and add deionized $H_2O$ to 1.0 liter.

2

| | Grams/liter |
|---|---|
| Cerelose (added post sterilization) | 50.0 |
| Soybean grits | 5.0 |
| NaCl | 1.0 |
| Yeast extract | 2.5 |
| K$_2$HPO$_4$ | 2.0 |
| KH$_2$PO$_4$ | 1.0 |

Adjust pH 6.8 to 7.0 and add deionized H$_2$O to 1.0 liter.

3

| | Grams/liter |
|---|---|
| Cerelose (added post sterilization) | 50.0 |
| Soybean flour | 5.0 |
| Malt extract | 20.0 |
| Yeast extract | 5.0 |
| NaCl | 1.0 |
| KH$_2$PO$_4$ | 4.1 |
| K$_2$HPO$_4$ | 0.8 |

Adjust pH to 6.0 and add deionized H$_2$O to 1.0 liter.

EXAMPLE 2

Medium: As exemplified in Example 1 and as indicated below.
Volume/flask: 100 ml./500 ml. Erlenmeyer flask with cotton plug.
Sterilization: 35 minutes at 120° C. and 15 lb. pressure.
Inoculum: ½ of a 7-day agar slant culture.
Incubation Temp.: 28° C.
Agitation: Gump rotary shaker~260 r.p.m.
Substrate: 0.1% (1.0 g./liter) 5-anilino-1,2,3,4-thiatriazole powder added at 48 hours.

| Culture | Medium | Yield of 5-(p-hydroxyanilino)-1,2,3,4-thiatriazole | |
|---|---|---|---|
| | | Grams/liter | Percent conversion |
| Aspergillus tamarii NRRL 3280 | 1 | 0.64 | 58.9 |
| Aspergillus terreus NRRL 1960 | 1 | 0.031 | 2.8 |
| Rhizopus stolonifer ATCC 10404 | 1 | 0.047 | 4.3 |
| Penicillium species A-1 NRRL 3281 | 1 | 0.019 | 1.7 |
| Penicillium species A-85 NRRL 3282 | 1 | 0.017 | 1.5 |
| Aspergillus flavus oryzae type NRRLA 13647 | 1 | 0.43 | 39.5 |
| Nocardia species Act-116 NRRL 3283 | 2 | 0.030 | 2.7 |
| Streptomyces olivaceus NRRLB 1125 | 2 | 0.038 | 3.5 |
| Boletinus pictus F-12 NRRL 3284 | 3 | 0.053 | 4.8 |
| Coniphora puteana USDA Madison #515 | 3 | 0.021 | 1.9 |
| Pleurotus candidus SS-31 NRRL 3285 | 3 | 0.011 | 1.1 |

EXAMPLE 3

Fermntation of *Aspergillus tamarii* in shaken flasks by employing higher levels of substrate added from a 40% DMSO (dimethylsulfoxide) solution or a 30% DMF (dimethylformamide) solution. Results follow:

EXAMPLE 4

*Aspergillus tamarii* cultivated in 30-liter fermentors

Medium: 1
Volume: 10 liters
Blade angle: 90°
Antifoam: 0.005% methylpolysiloxane (silicone antifoam)
Sterilization: 1.0 hr. at 120° C. and 15 lb.
Air rate: ½ vol./vol./min.
Agitation: 360 r.p.m.
Inoculum: 10% by volume—72 hr. vegetative seed flasks
Substrate: 5-anilino-1,2,3,4-thiatriazole was dissolved in DMSO to a concentration of 40% and added in increments of 0.5 gram/liter at 20 hr., 42 hr., 66 hr., 90 hr., 114 hr., 138 hr., and 162 hr. The total amount of substrate was 3.5 grams/liter. Yields were as follows:

| Hrs.: | Grams/liter |
|---|---|
| 66 | 0.37 |
| 90 | 0.67 |
| 118 | 0.99 |
| 140 | 1.10 |
| 162 | 1.18 |
| 186 | 0.86 |

EXAMPLE 5

Isolation of product

An alternate and improved method of recovery may be used for the solation of the p-hydroxylated product. Approximately 95% of the product is either tightly bound to or in the mycelium. Thus, the harvested whole culture may be filtered with Filter-Cel and the filtered beer then discarded. The mycelia is extracted several times with acetone, and the acetone extract containing some water is then decolorized by treatment with CaCl$_2$ until saturation. The product is then further decolorized with activated carbons.

The acetone extract may also be decolorized by first dehydrating with CaCl$_2$ or Na$_2$SO$_4$ and then treating with activated carbon.

The colorless acetone extract is concentrated and the product is crystallized in pure form by the addition of 3 to 6 volumes of hexane or three volumes of distilled H$_2$O.

EXAMPLE 6

*Aspergillus terreus* NRRL 1960

| Medium: | Grams/liter |
|---|---|
| Cerelose (added post sterilization) | 50.0 |
| Soybean flour | 5.0 |
| NaCl | 1.0 |
| Yeast extract | 5.0 |
| KH$_2$PO$_4$ | 4.1 |
| K$_2$HPO$_4$ | 0.8 |

Adjust pH to 6.0 with NaOH and add deionized H$_2$O to 1.0 liter.

Volume/flask: 50 to 100 ml./500 ml. Erlenmeyer flask with cotton plug or milk filter gauze.
Sterilization: 35 min. 120° C. at 15 lb. pressure.
Inoculum: Flasks are inoculated with half of a broth suspension of a 7 day agar slant culture of *A. terreus* NRRL 1960.
Incubation temp.: 28° C.
Agitation: Gump rotary shaker, 240 to 260 r.p.m.

| Sample | Type of inoculum | Substrate form | Time and amount of substrate | Total substrate, g./liter | 5-(p-hydroxyanilino)-1,2,3,4-thiatriazole (product yield, g./liter) | | | |
|---|---|---|---|---|---|---|---|---|
| | | | | | 120 hr. | 144 hr. | 162 hr. | 192 hr. |
| A | Agar slant | Powder | 0.5 g./l. at 24, 48, 72, 96 hours | 2.0 | 0.81 | 0.88 | 0.93 | 1.04 |
| B | do | 40% DMSO solution | do | 2.0 | 1.75 | 1.76 | 1.58 | 1.96 |
| C | do | 30% DMF solution | do | 2.0 | 1.55 | 1.48 | 1.42 | 2.02 |
| D | 10% 72-hr. vegetative | 40% DMSO solution | do | 2.0 | 1.19 | 1.12 | 1.14 | 1.20 |
| E | do | 30% DMF solution | do | 2.0 | 1.58 | 1.45 | 1.38 | 1.61 |
| F | do | do | 1.0 g./l. at 24, 48, 72, 96 hours | 4.0 | 2.12 | 1.57 | 2.42 | 2.3 |

Flasks are inoculated and incubated on the shaker for 48 hours. At that time 0.05% to 0.1% of powdered 5-(anilino)-1,2,3,4-thiatriazole is added to each flask. The flasks are then returned to the shaker and are harvested at the desired age. The pooled harvested beer is adjusted to pH 7.0 and one volume of acetone added. The beer is then extracted twice with two volumes of ethyl acetate, chloroform, or methylene chloride. The extract is evaporated to dryness under vacuum, and the residue is then dissolved in chloroform and chromatographed on a silica gel column. Two major transformation products are eluted from the column with increased amounts of ethyl ether in the chloroform. The first major microbial product is 5-(p-hydroxyanilino)-1,2,3,4-thiatriazole. The second major product after elution from the column is dissolved in acetone and crystallized by the adition of hexane. The product is also crystallized by washing eluate column fraction residues with methylene chloride. The crystalline product melted at 122°–123° C. Elemental analysis, IR and NMR spectra, are consistent with the structure for 5-(orthohydroxyanilino)-1,2,3,4-thiatriazole.

All of the microorganisms set forth in the foregoing description have been deposited at the Culture Collection Unit of the Northern Utilization Research and Development Division, U.S. Department of Agriculture, Peoria, Ill., or other indicated depository and are publicly available.

While the compounds of the present invention can be made by microbial transformation of 5-anilino-1,2,3,4-thiatriazole as described in detail above, the compounds can also be made by means of a chemical process. In such a process, p-aminophenol is converted to 1,3-p-hydroxyphenylthiourea by reaction with carbon disulfide. The product is heated with acetic anhydride to produce p-acetoxyphenylisothiocyanate, which is in turn dissolved in alcohol and reacted with hydrazine hydrate to produce p-hydroxyphenylthiosemicarbazide. The last-named product is then mixed with aqueous acetic acid and reacted with sodium nitrite to produce 5-p-hydroxyanilino-1,2,3,4-thiatriazole. A more detailed description of a suitable synthetic process is set forth in the following example.

EXAMPLE 7

164 grams of p-aminophenol is added to 152 g. of carbon disulfide and then mixed with 1700 ml. of ethanol. The mixture is refluxed for six hours with stirring, after which it is cooled to 15° C., filtered, washed, and air dried. 157 g. of 1,3-p-hydroxyphenylthiourea is obtained, which is added to 600 ml. of acetic anhydride, heated to 100° C., and held at that temperature for one hour. The solution is then quenched with 2 liters of water and allowed to cool overnight. The resulting crystals are washed with cold water, slurried in hexane at 50° C., and then filtered. The extract procedure with hexane is repeated; and, after cooling, the product, p-acetoxyphenylisothiocyanate, is filtered off. 86 g., representing a 72% yield, is obtained, and 57.9 g. are dissolved in 150 ml. ethanol. 30 g. of hydrazine hydrate, 30 ml. of water, and 50 ml. of ethanol are added and the solution is heated over a one-hour period, allowing the temperature to rise to about 45° C. The solution is cooled to 5° C., filtered, and the liquors are concentrated in a vacuum to obtain a second crop of crystals. 37 g., representing a 67% yield of p-hydroxyphenylthiosemicarbazole, are obtained. 18.3 g. are then mixed with 400 ml. of 60% aqueous acetic acid. A solution of 6.9 g. of sodium nitrite, dissolved in 50 ml. of water, is added dropwise to the first solution at 5°–10° C. The mixture is then filtered and the product cake is washed with water. The cake is dissolved in 770 ml. of acetone, to which is added 2 g. of actviated carbon. One liter of water at 10° C. is slowly added. The mixture is filtered and the resulting powder is air dried at room temperature. 15 g. of 5-p-hydroxyanilino-1,2,3,4-thiatriazole is obtained, representing a 77% yield.

We claim:
1. A process for producing 5-(hydroxyanilino)-1,2,3,4-thiatriazole by microbially transforming 5-anilino-1,2,3,4-thiatriazole, which process comprises culturing a microorganism of an order selected from the group consisting of Moniliales, Mucorales, Agaricales, Polyporales, and Actinomycetales in an aqueous nutrient medium containing assimilable sources of nitrogen and carbon and 5-anilino-1,2,3,4-thiatriazole; and recovering 5-(hydroxyanilino)-1,2,3,4-thiatriazole from the medium.

2. The process of claim 1 wherein the microorganism is of a family selected from the group consisting of Moniliaceae, Mucoraceae, Boletaceae, Agaricaceae, Thelephoraceae, Actinomycetaceae, and Streptomycetaceae.

3. The process of claim 1 wherein the microorganism is of a genus selected from the group consisting of Aspergillus, Penicillium, Rhizopus, Boletinus, Pleurotus, Coniphora, Nocardia, and Streptomyces.

4. The process of claim 1 wherein the microorganism is selected from the group consisting of *Aspergillus tamarii*, *Aspergillus terreus*, *Aspergillus flavus oryzae* type, Penicillium species A–1, Penicillium species A–85, *Rhizopus stolonifer*, *Boletinus pictus*, *Pleurotus candidus*, *Coniphora puteana*, Nocardia species ACT 116, and *Streptomyces olivaceus*.

5. The process of claim 1 wherein the microorganism is selected from the group consisting of *Aspergillus tamarii* NRRL 3280, *Aspergillus terreus* NRRL 1960, *Aspergillus flavus oryzae* type NRRL 13647, Penicillium species A–1 NRRL 3281, Penicillium species A–85 NRRL 3282, *Rhizopus stolonifer* ATCC 10404, *Boletinus pictus* F–12 NRRL 3284, *Pleurotus candidus* SS–31 NRRL 3285, *Coniphora puteana* USDA 515, Nocardia species ACT 116 NRRL 3283, and *Streptomyces olivaceus* NRRLB 1125.

6. The process of claim 5 wherein the 5-anilino-1,2,3,4-thiatriazole is added to the medium in periodic increments.

7. The process of claim 5 wherein the 5-anilino-1,2,3,4-thiatriazole is added to the medium in a solvent solution.

References Cited

UNITED STATES PATENTS 3,312,598    4/1967    Rosi et al. _____ 195—51
3,317,401    5/1967    Nielson et al. _____ 195—51

ALVIN E. TANENHOLTZ, Primary Examiner

U.S. Cl. X.R.

195—29